United States Patent
Kambara et al.

(10) Patent No.: US 8,245,077 B2
(45) Date of Patent: Aug. 14, 2012

(54) FAILOVER METHOD AND COMPUTER SYSTEM

(75) Inventors: Yasuyuki Kambara, Yokohama (JP); Keisuke Hatasaki, Kawasaki (JP); Ryuji Shinchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 356 days.

(21) Appl. No.: 12/510,416

(22) Filed: Jul. 28, 2009

(65) Prior Publication Data

US 2010/0064165 A1    Mar. 11, 2010

(30) Foreign Application Priority Data

Sep. 11, 2008    (JP) .................................. 2008-233286

(51) Int. Cl.
*G06F 11/00*    (2006.01)
(52) U.S. Cl. .......................................... 714/4.11; 714/13
(58) Field of Classification Search .................... None
See application file for complete search history.

(56) References Cited

U.S. PATENT DOCUMENTS

| | | | |
|---|---|---|---|
| 7,487,390 B2 | 2/2009 | Saika | |
| 2003/0065972 A1* | 4/2003 | Yamamoto et al. | 714/4 |
| 2003/0120772 A1* | 6/2003 | Husain et al. | 709/224 |
| 2003/0163755 A1* | 8/2003 | Fung et al. | 714/4 |
| 2009/0077370 A1* | 3/2009 | Barabash et al. | 713/100 |

FOREIGN PATENT DOCUMENTS

| | | |
|---|---|---|
| JP | 2006-163963 A | 6/2006 |
| JP | 2006-229512 A | 8/2006 |
| JP | 2007-66216 A | 3/2007 |
| JP | 2007-164305 A | 6/2007 |
| JP | 2007-183701 A | 7/2007 |
| JP | 2007-279890 A | 10/2007 |
| JP | 2007-293422 A | 11/2007 |
| JP | 2008-97276 A | 4/2008 |
| JP | 2008-140198 A | 6/2008 |
| JP | 2008-293245 A | 12/2008 |

* cited by examiner

*Primary Examiner* — Gabriel Chu
*Assistant Examiner* — Jason Bryan
(74) *Attorney, Agent, or Firm* — Mattingly & Malur, PC

(57) ABSTRACT

A failover method in a computer system having a first computer which performs an operation, a plurality of standby computers including a first standby computer and a second standby computer, a second computer which has a management module which manages the first computer and the standby computer, and a third computer which manages starting and stopping of the standby computer. The third computer acquires configuration information of the first computer, the second computer and the plurality of standby computers from the management module of the second computer. The third computer determines whether a failure has occurred in the second computer. The third computer sets up the management module on the second standby computer based on the acquired configuration information when the failure in the second computer is detected.

14 Claims, 18 Drawing Sheets

SERVER MANAGEMENT TABLE

| CHASSIS IDENTIFIER 501 | SERVER IDENTIFIER 502 | POWER STATE 503 | SERVER CONFIGURATION 504 | ALLOCATED DISK 505 | SERVER STATE 506 | SWITCH DESTINATION 507 | TYPE 508 |
|---|---|---|---|---|---|---|---|
| CHASSIS 1 | HOST 1 | ON | CPU 1<br>MEM 1<br>HBA 1<br>NIC 1 | LU 1 | ABNORMAL | HOST 4 | - |
| | HOST 2 | ON | CPU 2<br>MEM 1<br>HBA 1<br>NIC 1 | LU 2 | NORMAL | - | - |
| | HOST 3 | ON | CPU 1<br>MEM 2<br>HBA 1<br>NIC 1 | LU 3 | NORMAL | - | - |
| | HOST 4 | OFF | CPU 1<br>MEM 1<br>HBA 1<br>NIC 1 | - | NORMAL | - | SERVER MANAGEMENT |

SWITCH MANAGEMENT TABLE 118

| SWITCHING GROUP 601 | ACTIVE SERVER IDENTIFIER 602 | STANDBY SERVER IDENTIFIER 603 | STATE 604 |
|---|---|---|---|
| GROUP 1 | HOST 1<br>HOST 2<br>HOST 3 | HOST 4 | IN USE |

Fig. 6

SWITCH INFORMATION MANAGEMENT TABLE 119

| SWITCHING GROUP 701 | ACTIVE SERVER IDENTIFIER 702 | DEVICE IDENTIFIER 703 | BIOS INFORMATION 704 |
|---|---|---|---|
| GROUP 1 | HOST 1 | WWN 1 = WWN 11<br>MAC 1 = MAC 11 | BIOS SETTING INFORMATION 1 |
| | HOST 2 | WWN 1 = WWN 21<br>MAC 1 = MAC 21 | BIOS SETTING INFORMATION 2 |
| | HOST 3 | WWN 1 = WWN 31<br>MAC 1 = MAC 31 | BIOS SETTING INFORMATION 3 |

Fig. 7

SWITCH INFORMATION STORAGE AREA

| INFORMATION | CONTENT |
|---|---|
| SERVER IDENTIFIER FOR SERVER ON WHICH SERVER MANAGEMENT MODULE OPERATES | HOST 1 |
| SERVER IDENTIFIER OF STANDBY SERVER | HOST 4 |
| SWITCH INFORMATION | WWN 11<br>MAC 12<br>BIOS SETTING INFORMATION 1 |

Fig. 11

EVENT STORAGE AREA                                                                     407

| TIME | EVENT | TRANSMISSION STATE |
|---|---|---|
| 2008/05/29 18:13 | HOST 1, FAN ROTATION SPEED WARNING | FINISHED |
| 2008/05/29 18:15 | HOST 1, TEMPERATURE WARNING | FINISHED |
| 2008/05/30 10:17 | HOST 1, TEMPERATURE WARNING | FINISHED |
| 2008/05/30 12:18 | HOST 3, TEMPERATURE ABNORMAL | FINISHED |
| 2008/05/30 12:38 | HOST 1, SERVER ABNORMAL | NOT FINISHED |
| 2008/05/30 12:39 | HOST 1, SWITCH EVENT | NOT FINISHED |
| 2008/05/30 13:11 | HOST 1, STANDBY SERVER START | NOT FINISHED |
| 2008/05/30 18:18 | HOST 1, SERVER MANAGEMENT MODULE NORMAL START | NOT FINISHED |

FAILOVER METHOD AND COMPUTER SYSTEM

CLAIM OF PRIORITY

The present application claims priority from Japanese patent application JP 2008-233286 filed on Sep. 11, 2008, the content of which is hereby incorporated by reference into this application.

BACKGROUND OF THE INVENTION

The present invention relates to a failover method which switches a server in operation to a standby server upon occurrence of a failure in the server in operation, and, in particular, to N+1 cold standby.

One way to secure reliability of a server system is to configure a multiplexed server. By installing a standby server different from a server in operation, if a failure occurs in the server in operation, it switches to the standby server to take over the operation.

There are various ways to configure a fault tolerance configuration. For example, there is a method that arranges servers redundantly in a network, each server monitors another server without overlapping with other servers once in every monitoring cycle, and an active server switches to a standby server when failure occurs in the active server (refer to JP 2006-229512 A).

Moreover, there is a method which determines the order of the processing according to the priority of the node, and avoids the delay of the succession processing for nodes that have high priority (refer to JP 2007-279890 A).

Since early times, there has been a need to improve the reliability of a server system at a low cost. One way to improve the reliability of a server system at a low cost includes "cold standby".

As for cold standby, a plurality of servers having the same system configurations are provided, and when one server performs an operation, the other servers wait idle in a standby state. In a case where a failure occurs in the active server in operation, the standby server device starts up and takes over the operation.

However, cold standby requires having a management server and does not satisfy the above requirement.

One method to solve this problem includes running a management program which performs processing equivalent to the processing executed in a management server in the active server and managing the overall servers.

SUMMARY OF THE INVENTION

However, when a failure occurs in the server which manages the whole server, it cannot switch to the standby server since the failure occurred in the server itself, which should be coping with the failure. Moreover, the method cannot deal with failures in other servers.

The present invention provides a cold standby management method that secures the reliability of a computer system by performing switching processing normally even if a failure occurs in the server which manages the overall servers, without needing an additional management server.

A representative aspect of this invention is as follows. That is, there is provided a failover method performed in a computer system having a first computer which performs an operation, a plurality of standby computers including a first standby computer and a second standby computer, a second computer which has a management module which manages the first computer and the standby computer, and a third computer which manages start and stop of the standby computer. The method includes the following steps of processing. The third computer acquires configuration information of the first computer, the second computer and the plurality of standby computers from the management module of the second computer. The third computer determines whether a failure occurred in the second computer. The third computer notifies the second computer that a failure occurred in the first computer. The second computer, which has received the notification of the failure from the third computer, takes over the operation from the first computer to the first standby computer. The third computer sets up the management module on the second standby computer based on the acquired configuration information in a case of detecting that the failure has occurred in the second computer.

According to this invention, in a case where a failure occurs in a computer which has a management module, the computer having the management module can be switched to a standby computer. Moreover, the management module which was taken over by the standby computer detects that a failure occurred in the computer with the management module, and can acquire events which were not able to be received during the period when the computer with the management module was switched to the standby computer. Thereby, the management module can have consistency between before and after the switching processing.

BRIEF DESCRIPTION OF THE DRAWINGS

The present invention can be appreciated by the description which follows in conjunction with the following figures, wherein:

FIG. 5 is a diagram showing an example of a server management table according to the embodiment of this invention;

FIG. 6 is a diagram showing an example of a switch management table according to the embodiment of this invention;

FIG. 7 is a diagram showing an example of a switch information management table according to the embodiment of this invention;

FIG. 11 is a diagram showing an example of a switch information storage area according to the embodiment of this invention;

FIG. 17 is a diagram showing an example of an event storage area according to the embodiment of this invention;

DETAILED DESCRIPTION OF THE PREFERRED EMBODIMENT

First, the present invention will be briefly described. In accordance with this invention, an SVP (SerVice Processor) maintains information related to the server on which the server management module operates in advance while the server management module is operating normally. When a failure occurs in the server on which the server management module operates, the SVP which detects the failure writes information regarding the server in which the server management module is operating into the standby server, and makes the standby server to take over the server management unit. Thereafter, the SVP notifies the server management module which was taken over by the standby server that switching processing of the server on which the server management module was operating is being performed due to a failure.

Since the SVP writes the information regarding the server in which the server management module is operating into the standby server, it is possible to set up the same environment as the server in which the failure occurred. Therefore, it is not necessary to perform a setting for switching the server management module to a standby server, and the standby server can take over the server management module quickly from the time of failure occurrence, and the burden of the user to perform the operation can be reduced.

The server management module taken over by the standby server is able to know that the failure had occurred in the server on which the server management module had been operating from the notification of the SVP.

Moreover, it is able to switch the servers in a case where the failure occurs in the server on which the server management module operates. Therefore, its influence on the operation can be reduced to a minimum. Moreover, the above processing can be executed at low cost.

Next, an embodiment of this invention will be described.

Figure 1:
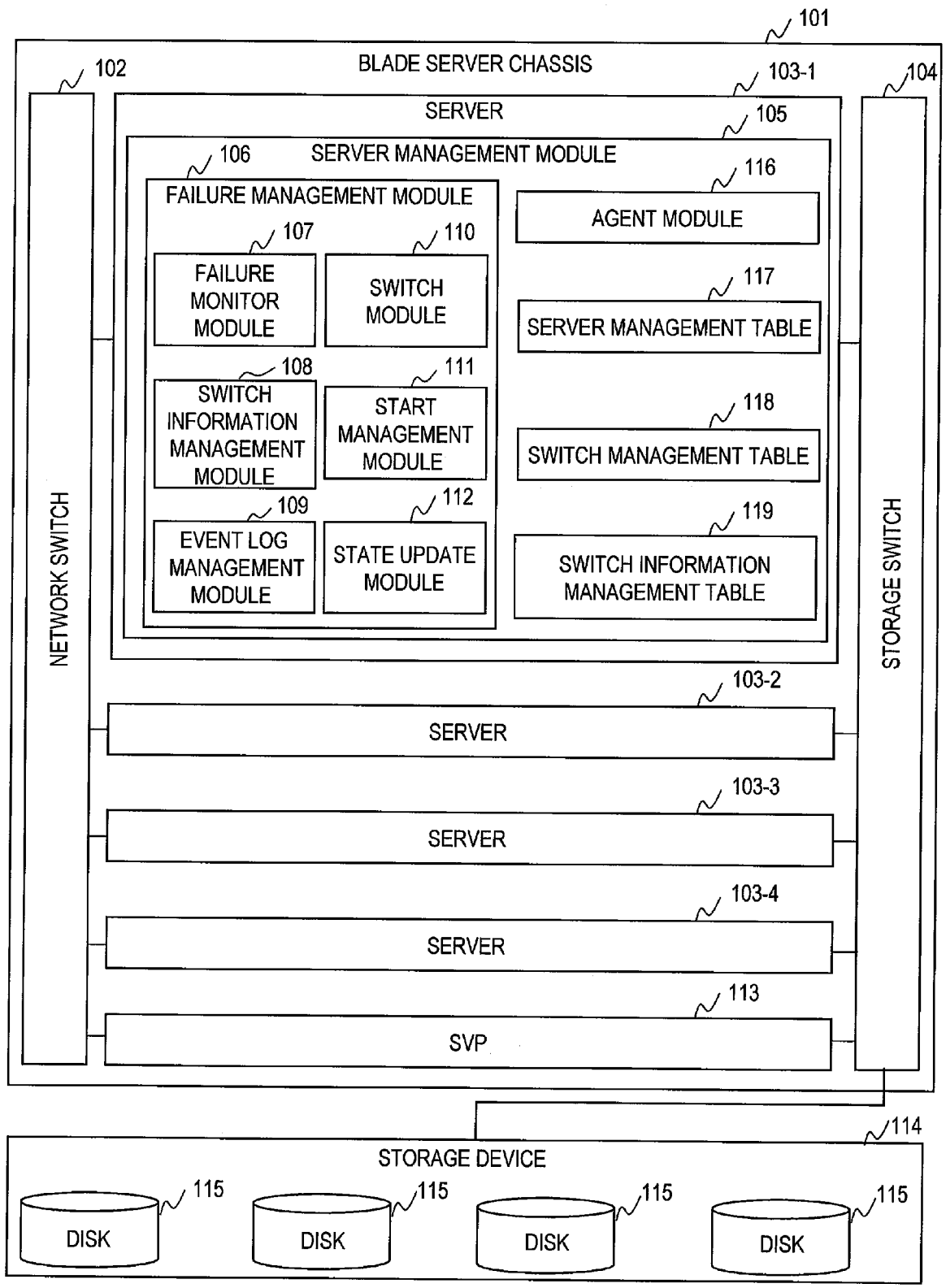
FIG. 1 is a block diagram showing a hardware configuration of a blade server according to an embodiment of this invention.

FIG. 1 is a block diagram showing a hardware configuration of a blade server according to the embodiment of this invention.

A blade server comprises a blade server chassis 101 and a storage device 114. A blade server chassis 101 comprises a network switch 102, a storage switch 104, and an SVP 113, and is connected to a server 103-1, a server 103-2, a server 103-3, and a server 103-4. The storage device 114 is connected to the storage switch 104. Hereinafter, in the case where the server 103-1, the server 103-2, the server 103-3, and the server 103-4 are not distinguished, they are indicated as "server(s) 103".

A server management module 105 is operating on a server 103-1. A server management module 105 is a program which manages the servers 103 each of which is operating in the blade server. Programs for performing operations are executed in the server 103-2 and the server 103-3. The server 103-4 is a standby server for switching the server 103-1, the server 103-2, and the server 103-3 when a failure occurs in them. It is noted that in a case where not distinguishing which of the servers 103 is the standby server, it is indicated as the standby server 103.

The server management module 105 includes a failure management module 106, an agent module 116, a server management table 117, a switch management table 118 and a switch information management table 119.

The agent module 116 is installed in all of the servers 103 that the server management module 105 monitors, and performs monitoring of the type or the state of the operation system (OS), the processes, failure of software, etc. in each of the servers 103.

Server management table 117 holds information for managing the configuration and the state of the servers 103 in the blade server. Details will be described later with reference to FIG. 5.

The switch management table 118 holds information for switching to a standby server when a failure occurs in any of the servers 103. That is, the switch management table 118 holds information for controlling N+1 cold standby. Details will be described later with reference to FIG. 6.

"N+1 cold standby" is a method of making a standby server 103 to take over processing (operation) of a server 103 which was performing operations, when a failure occurs in the server which was performing operations, in a blade server having N sets of active servers 103 and one set of standby server 103.

The switch information management table 119 holds information required for taking over when the server management module 105 switches the failure-occurred server 103 to a standby server 103. Specifically, the server management module 105 writes the information held in the switch information management table 119 into the standby server 103, and switches the failure-occurred server 103 to the standby server 103. Details will be described later with reference to FIG. 7.

The failure management module 106 includes a failure monitoring module 107, a switch information management module 108, an event log management module 109, a switch module 110, a start management module 111 and a state update module 112. The failure management module 106 monitors the failure of the servers 103 and performs processing against the occurred failure.

The failure monitoring module 107 monitors the failure of the hardware of the servers 103. In FIG. 1, the failure monitoring module 107 monitors the failure of the server 103-2 and the server 103-3.

The switch information management module 108 manages information for switching the failure-occurred server 103 to a standby server 103 (in this case, server 103-4) when a failure occurs in the server 103 (in this case, server 103-2 and server 103-3) which the server management module 105 is monitoring. Moreover, in accordance with this embodiment, the switch information management module 108 sets to the SVP 113 information for switching to the standby server (in this case, server 103-4) when a failure occurs in the server 103 (in this case, server 103-1) on which the server management module 105 is operating. Details of the processing will be described later with reference to FIG. 10.

The event log management module 109 receives events from the server 103, and manages the received events as a log. Moreover, in accordance with this embodiment, the event log management module 109 acquires from the SVP 113 the event log which the server 103 could not receive during the period from the occurrence of the failure in the server 103 on which the server management module 105 operates until the server is switched to the standby server 103, after the switching processing. Details of the processing will be described later with reference to FIG. 13.

The switch module 110 performs processing to switch to the standby server 103 (in this case, server 103-4) when a failure occurs in the servers 103 (in this case, server 103-2 and server 103-3) which the server management module 105 is monitoring.

When a failure occurs in the servers 103 (in this case, server 103-2 and server 103-3) which the server management module 105 is monitoring, the start management module 111 switches the servers 103 to the standby server 103 (in this case, server 103-4), and starts the switched standby server 103, and performs take over processing after the start. In accordance with this embodiment, the start management module 111 performs the processing to be performed after a failure occurs in the server 103 on which the server management module 105 is operating, and which is switched to the standby server 103. Details of the processing will be described later with reference to FIG. 9.

The state update module 112 updates the configuration and the state of the servers 103 in the blade server after a failure occurs in the servers 103 (in this case, server 103-2 and server 103-3) which the server management module 105 is monitoring, and which are switched to the standby server 103 (in this case, server 103-4).

The SVP 113 monitors a failure in the servers 103. When a failure occurs in the monitoring servers 103, the SVP 113 notifies the server management module 105 that the failure occurred in the servers 103. In accordance with this embodiment, the SVP 113 holds information regarding the servers 103 on which the server management module 105 operates, and when a failure occurs in the servers 103 on which the server management module 105 operates, by writing the information to the standby server 103, the SVP 113 can make the standby server 103 which takes over the server management module 105.

Moreover, while the server management module 105 is taken over from the servers 103 on which the server management module 105 was operating to the standby server 103, after maintaining the event log transmitted to the server management module 105 and completing the succession processing, the event log is transmitted to the server management module 105 which was taken over by the standby server 103. Thereby, the server management module 105 can maintain consistency between before and after the server management module 105 is taken over by the standby server. Moreover, the event which was not able to be received during the takeover processing can be processed correctly. Details of the processing will be described later with reference to FIGS. 14, 15, and 16.

The storage device 114 includes a plurality of recording media such as nonvolatile storage media (for example, hard disk drives), and a program for realizing the server management module 105, and a program for the operation are stored in each of the nonvolatile storage media or recording media. It is noted that the storage device 114 may store programs or data other than the programs described above.

In assigning the storage area of the storage device 114 in each server, it may be assigned a physical storage area, or may be assigned a logical storage area. In FIG. 1, the storage area of storage device 114 is divided into logical volumes (LUs), and the divided logical volumes (LUs) are assigned to each of the servers in servers 103. The assigned logical volumes (LUs) are recognized as one disk 115 from the servers 103. According to this embodiment, each disk 115 stores data necessary for each processing. Hereinafter, the logical volume is referred to as "LU".

It is noted that although the number of the servers from servers 103 on which the server management module 105 operates is one in FIG. 1, there may be a plurality of servers 103 on which the server management module 105 operates in this invention. Moreover, according to this invention, the servers 103 which are to be monitored by the servers 103 on which a plurality of server management units 105 operate may be different. In addition, this invention may be configured with a blade server having a plurality of blade server chassis 101.

Figure 2:
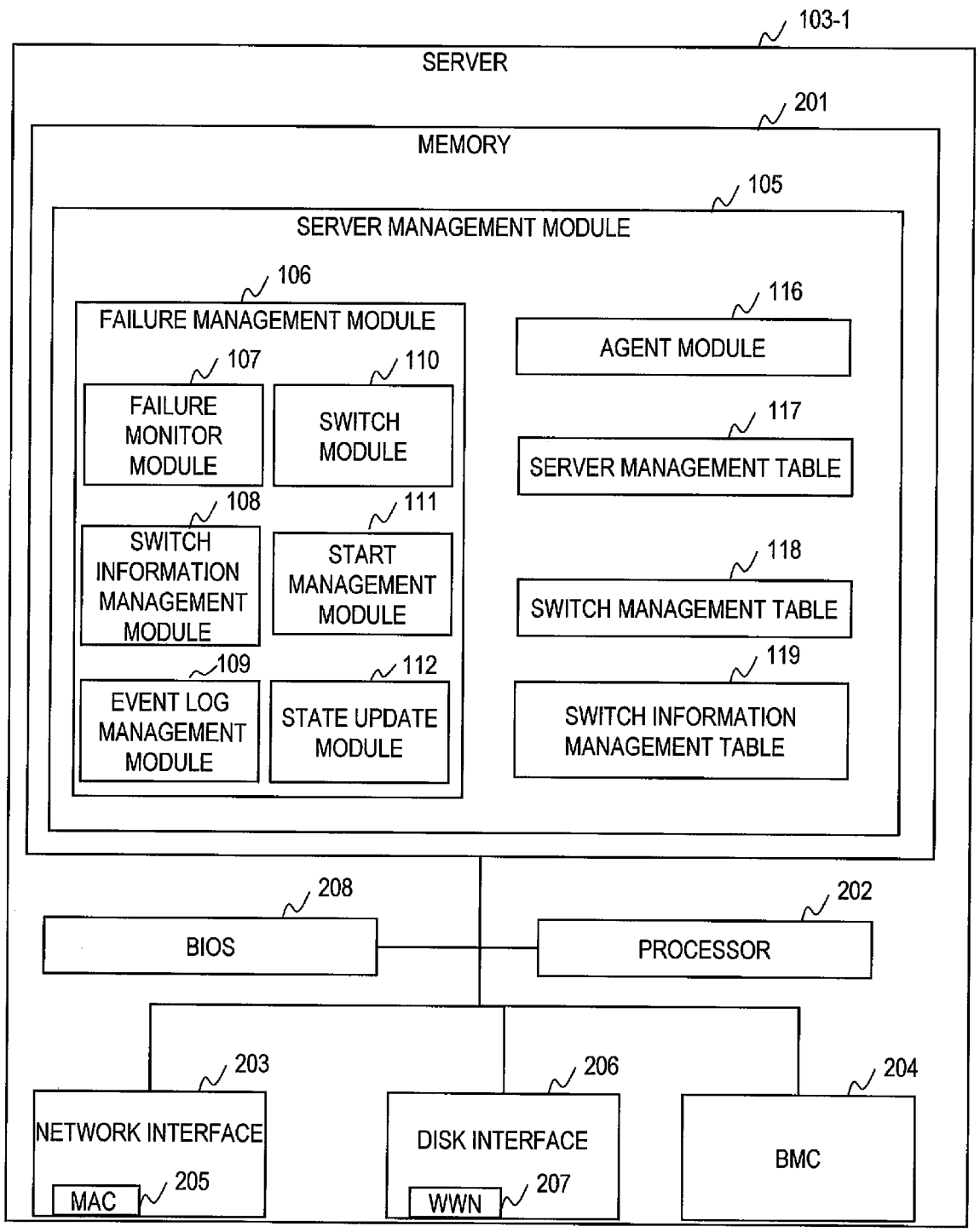
FIG. 2 is a block diagram showing a hardware configuration and a software configuration of a server on which a server management module operates according to the embodiment of this invention.

FIG. 2 is a block diagram showing the hardware configuration and the software configuration of the server 103-1 on which the server management module 105 operates according to the embodiment of this invention.

The server 103-1 comprises a memory 201, a processor 202, a network interface 203, a BMC (Baseboard Management Controller) 204, a disk interface 206 and a BIOS (Basic Input/Output System) 208.

A program for performing the server management module 105 is loaded to memory 201 of the server 103-1. The program is executed by the processor 202.

The network interface 203 is an interface for connecting the server 103-1 and a network apparatus (not illustrated). The network interface 203 holds MAC (Media Access Control) 205 in order to identify the network interface 203 of each of the servers 103. It is noted that although server 103-1 has one network interface 203 in FIG. 2, it may have a plurality of network interfaces 203.

The disk interface 206 is an interface for connecting the server 103-1 and the storage device 114. The disk interface 206 holds WWN (World Wide Name) 207 in order to identify the disk interface 206 of each server 103. It is noted that although the server 103-1 has a single disk interface 206 in FIG. 2, it may have a plurality of disk interfaces 206.

The BMC 204 is a processor for monitoring the failure of the server 103-1 itself. When a failure occurs in the server 103-1 itself, the BMC 204 detects the failure and notifies the SVP 113 that the failure has occurred.

The BIOS 208 is a program which provides the operating system (OS) or middleware with the input and output interface with each device incorporated in the server 103-1.

Figure 3:
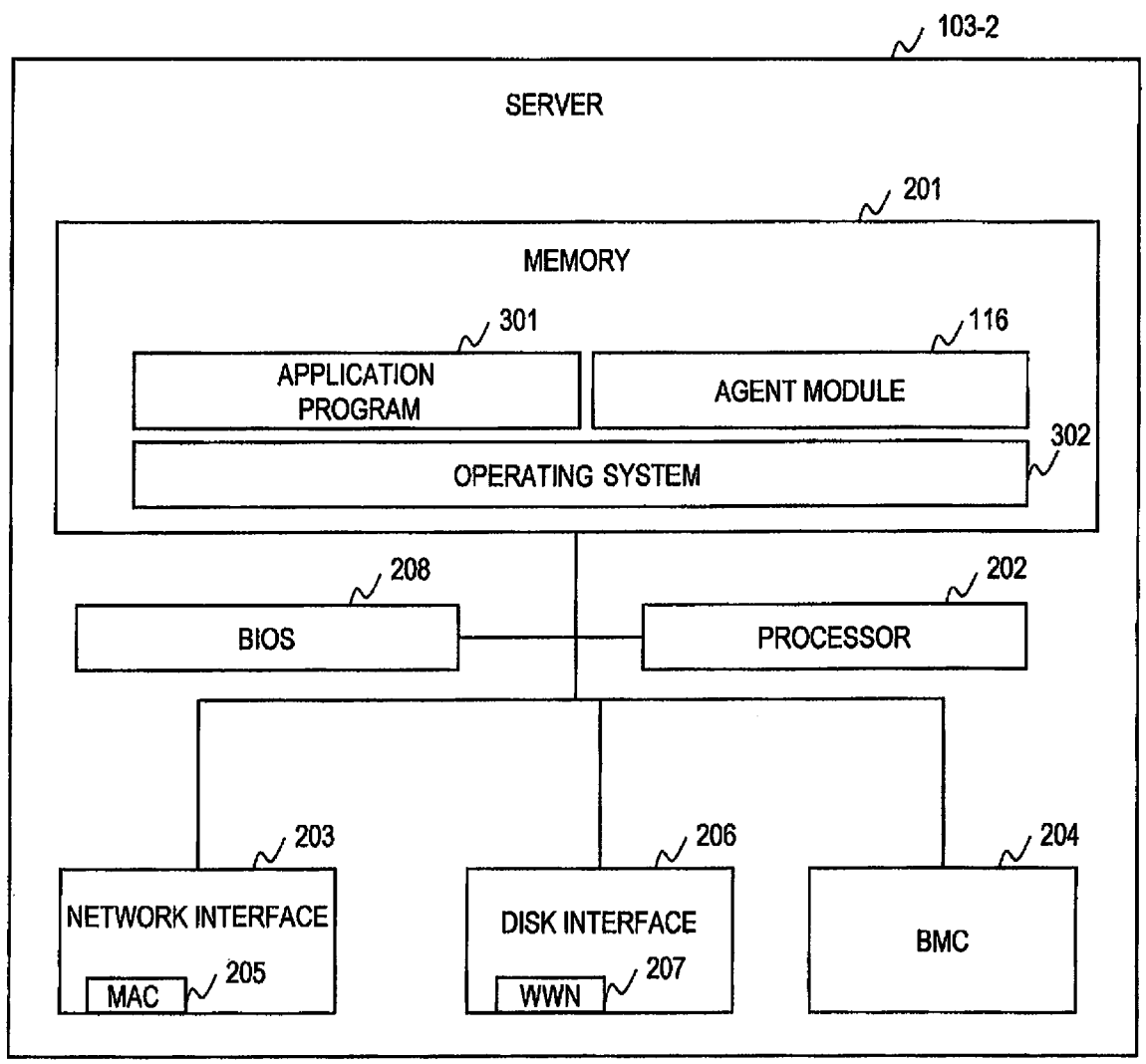
FIG. 3 is a block diagram showing a hardware configuration and a software configuration of a server which executes operations according to the embodiment of this invention.

FIG. 3 is a block diagram showing the hardware configuration and the software configuration of the server 103-2 which executes operations according to the embodiment of this invention.

The hardware configuration of the server 103-2 which performs operations is the same as that of the hardware configuration of the server 103-1 described above. However, the program stored in the memory 201 of the server 103-2 differs from that of the server 103-1.

Specifically, OS 302 stored in the memory 201 is executed by the processor 202 of the server 103-2, and the OS 302 manages the execution of an application program 301 and the agent module 116.

It is noted that server 103-3 is the same as server device 103-2.

Figure 4:
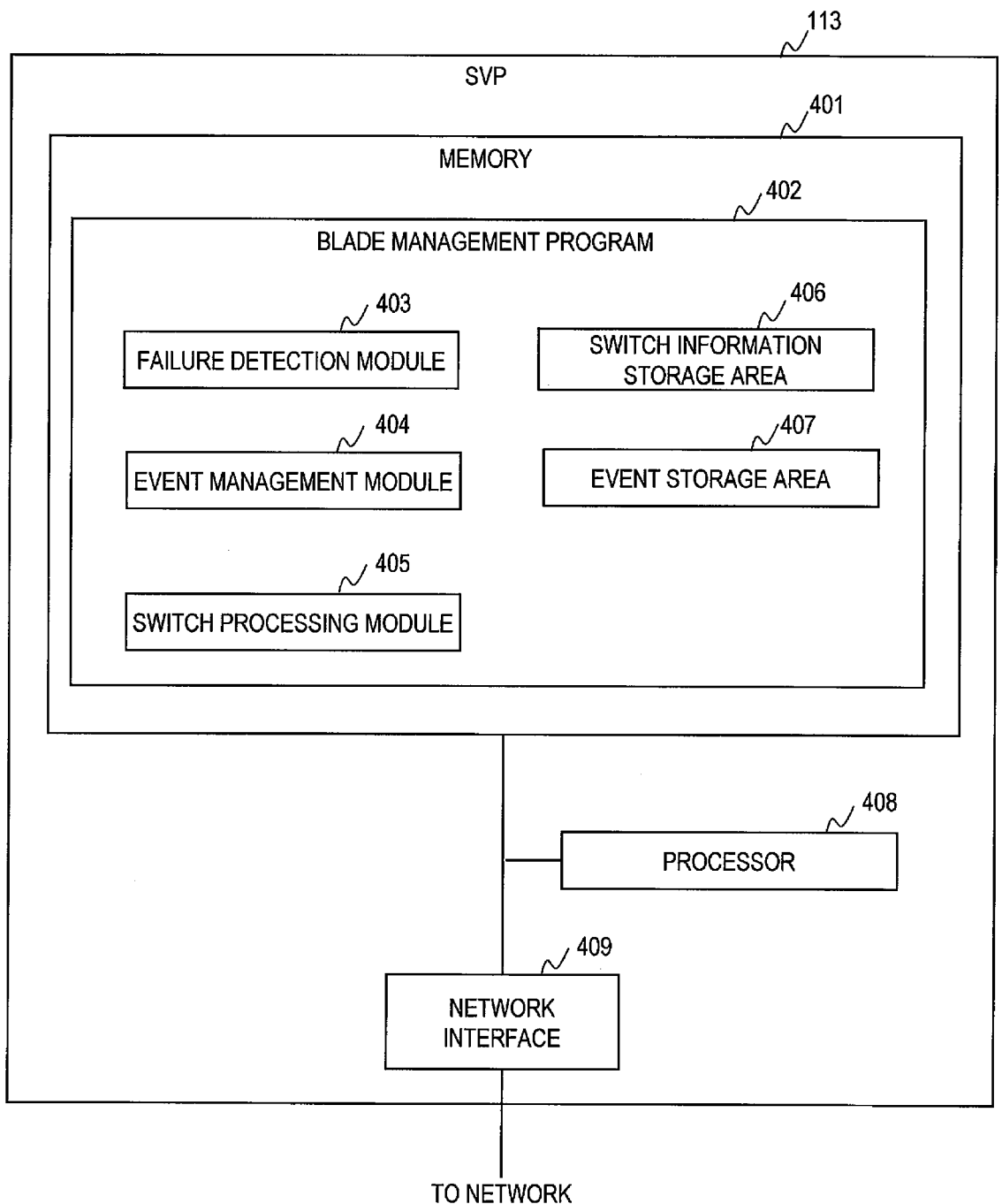
FIG. 4 is a block diagram showing a hardware configuration and a software configuration of an SVP according to the embodiment of this invention.

FIG. 4 is a block diagram showing the hardware configuration and the software configuration of the SVP 113 according to the embodiment of this invention.

The SVP 113 comprises a memory 401, a processor 408 and a network interface 409.

A blade management program 402 is loaded into the memory 401. The blade management program 402 is a program for monitoring the failures of all the servers 103 connected to the blade server, and for performing processing in accordance with the failure that occurred.

The blade management program 402 comprises a failure detection module 403, an event management module 404, a switching processing module 405, a switch information storage area 406 and an event storage area 407.

The failure detection module 403 monitors failures of all the servers 103 which are to be monitored.

The event management module 404 manages the log of events of the servers 103 on which the server management module 105 operates processes. It is noted that the event is transmitted from the servers 103.

The switching processing module 405 performs processing which switches the failure-occurred server 103 to the standby server 103, when a failure has occurred in the server 103 on which the server management module 105 operates.

The switch information storage area 406 manages information required in order to perform processing to switch the failure-occurred server 103 to the standby server 103, when a failure occurred in the server 103 on which the server management module 105 operates. Details will be described later with reference to FIG. 11.

The event storage area 407 stores the log of events which the SVP 113 receives while the failure-occurred server 103 is switched to the standby server 103, when a failure has occurred in the server 103 on which the server management module 105 operates. In accordance with this embodiment, the SVP 113 receives events from active servers 103-2, 103-3, etc., replacing the server management module 105 for the period while the server management module 105 is taken over by the standby server 103-4 from the server 103-1. Details will be described later with reference to FIG. 17.

In this invention, by the SVP 113 having a switching processing module 405, a switch information storage area 406 and an event storage area 407, in a case where a failure occurs in the servers 103 on which the server management module 105 operates, it can be quickly switched to the standby server 103. Moreover, the consistency of the operation of the server management module 105 before and after the switching can be maintained.

FIG. 5 is a diagram showing an example of the server management table 117 according to the embodiment of this invention.

The server management table 117 holds chassis identifier 501, server identifier 502, power state 503, server configuration 504, allocated disk 505, server state 506, switching destination 507 and type 508.

The chassis identifier 501 stores an identifier for identifying the blade server chassis 101.

The server identifier 502 stores an identifier for identifying the server 103.

The power state 503 stores information which shows whether the power of the servers 103 is on or not. Specifically, "ON" is stored in the power state 503 if the power of the server 103 is on, and "OFF" is stored in the power state 503 if he power of the server 103 is not on.

The server configuration 504 stores information regarding the hardware configuration of the server 103. Specifically, information regarding processor (CPU), memory (MEM), disk interface (HBA), and network interface (NIC) is stored in the server configuration 504.

The allocated disk 505 stores information which shows which disk 115 of the storage device 114 is allocated to the server 103. For example, LU 1 is allocated to the server 103-1. It is noted that by the server management module 105 matching WWN 207 which the disk interface 206 holds, and the disk 115, the server 103 and the disk 115 are connected.

The server state 506 stores information which shows the state of the server 103. Specifically, "NORMAL" is stored in the server state 506 when the server 103 is operating normally, and "ABNORMAL" is stored in the server state 506 when a failure occurs in the server 103.

The switching destination 507 stores information which identifies the server 103 which was switched by the switching processing after an abnormal incident occurred in a server 103. Specifically, the server identifier 502 of the corresponding server 103 is stored in the switching destination 507.

The type 508 stores information which shows the role of the servers 103 which are in operation. For example, "SERVER MANAGEMENT" is stored in type 508 at the server 103 on which the server management module 105 operates.

FIG. 6 is a diagram showing an example of a switch management table 118 according to the embodiment of this invention.

The switch management table 118 holds switching group 601, active server identifier 602, standby server identifier 603 and state 604.

The switching group 601 stores information regarding the group on which the switching processing will be performed. The server management module 105 performs switching processing for each group specified in the switching group 601.

The active server identifier 602 stores information for identifying the servers 103 which are actually in operation. Specifically, the server identifier 502 of the corresponding servers 103 is stored in the active server identifier 602.

The standby server identifier 603 stores an identifier for identifying the server 103 to be switched to when a failure occurs in the server 103 which corresponds to the active server identifier 602, that is, it stores an identifier for identifying the standby server 103.

The state 604 stores information which shows whether the standby server 103 (in this case, server 103-4) is in operation or not after the switching processing. Specifically, "IN USE" is stored in the state 604 when the standby server 103 is operating, and "NOT IN USE" is stored in the state 604 when the standby server 103 is not in operation. Using this information, it is possible to know that a failure occurred in the servers 103 and the switching processing was performed.

FIG. 7 is a diagram showing an example of the switch information management table 119 according to the embodiment of this invention.

The switch information management table 119 holds switching group 701, active server identifier 702, device identifier 703 and BIOS information 704.

The switching group 701 and the active server identifier 702 are the same as the switching group 601 and the active server identifier 602 in FIG. 6, respectively.

The device identifier 703 stores WWN (World Wide Name) for identifying the disk interface 206 of the server 103, and MAC (Media Access Control) for identifying the network interface 203 of the server 103. For example, the server 103-1 has one disk interface 206, so WWN (WWN 1) 207 is set to "WWN 11" and since the server 103-1 has one network interface 203, MAC (MAC 1) 205 is set to "MAC 11".

It is noted that if the server 103 includes a plurality of network interfaces 203 or a plurality of disk interfaces 206, a plurality of identifiers are stored.

The BIOS information 704 stores information regarding the BIOS (Basic Input/Output System) of the servers 103. It is noted that the BIOS information 704 may store not only information regarding the BIOS but also information regarding EFI (Extensible Firmware Interface).

Next, processing of conventional cold standby will be described.

Figure 18:
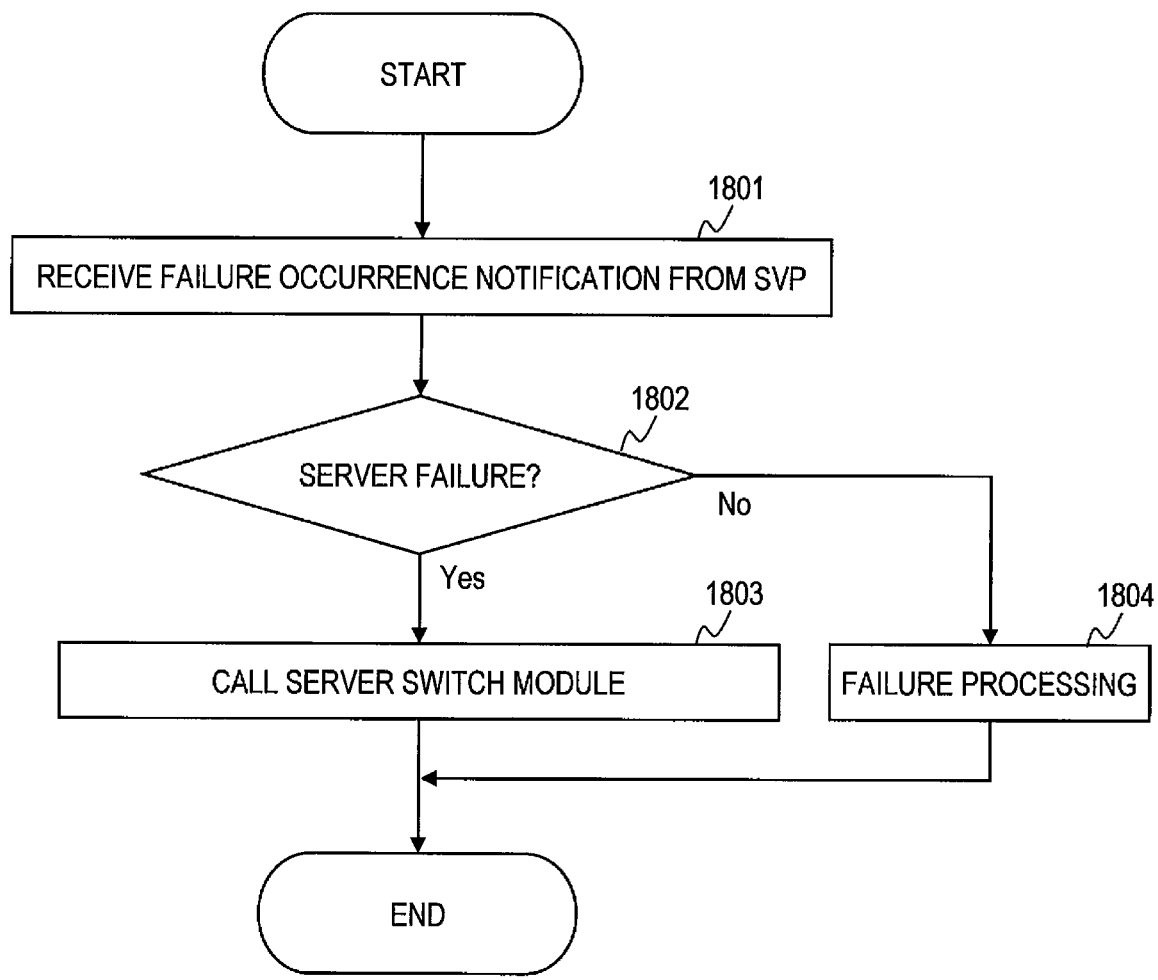
FIG. 18 is a flow chart showing processing of a failure monitoring module in a conventional cold standby.

FIG. 18 is a flow chart showing processing of a failure monitoring module 107 in the conventional cold standby. Processing described hereinafter is performed in response to the notification of a failure occurrence being sent from the SVP 113 to the server management module 105.

The failure monitoring module 107 receives notification of a failure occurrence from the SVP 113 (1801). The server identifier 502 of the servers 103 which detected the failure and the details of the failure are included in the received notification.

The failure monitoring module 107 refers to the received failure occurrence notification, and determines whether it is the failure of the server 103 or not (1802).

If it is determined that it is not a failure of the server 103, the failure monitoring module 107 performs failure processing corresponding to the notification of the received hardware fault (1804), and the process is completed. As to the failure of hardware other than the server 103, for example, there are failures of the power of the blade server and failures in the fan.

If it is determined that it is a failure of the server 103, the failure monitoring module 107 calls the switch module 110 (1803), and the process is completed.

Figure 19:
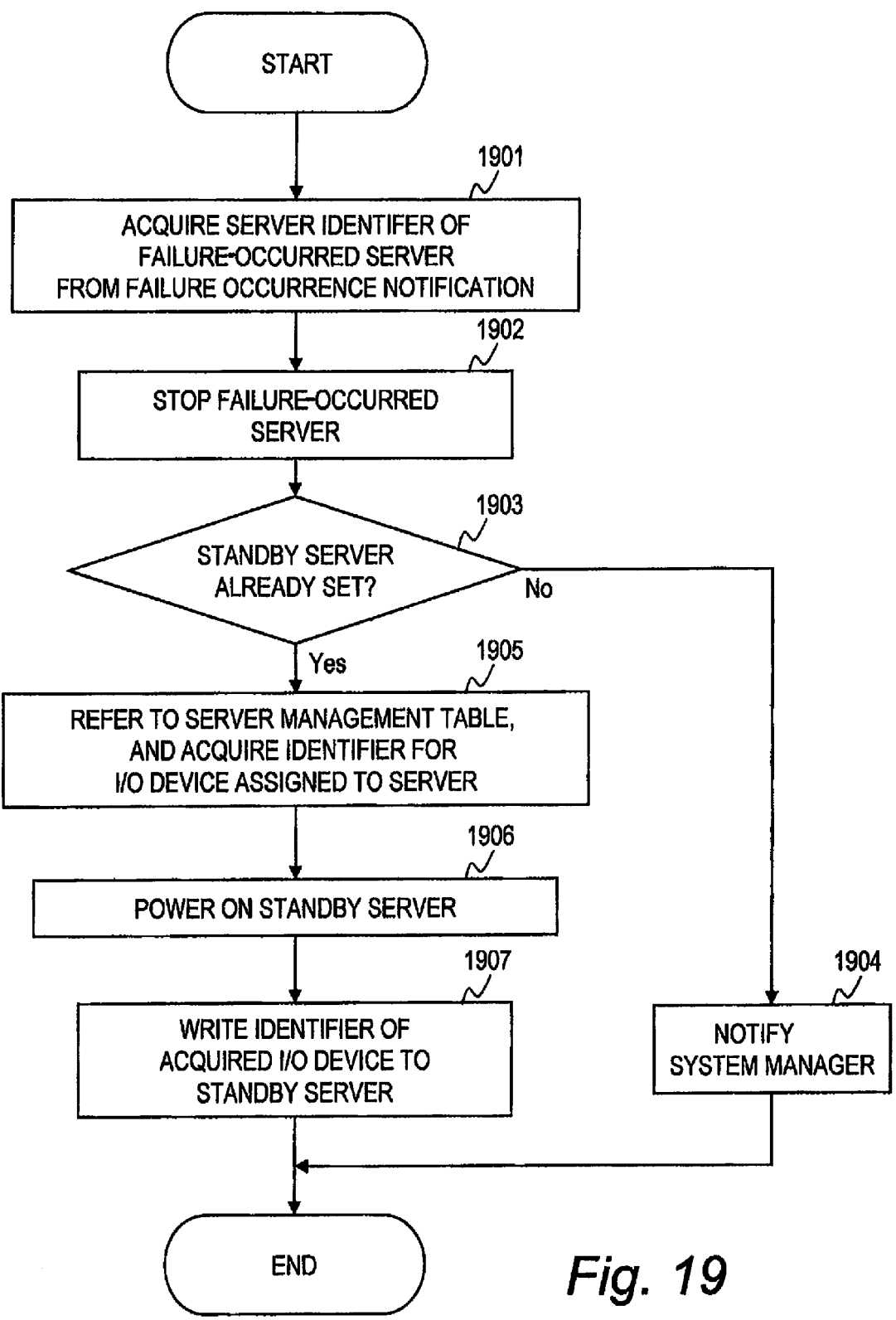
FIG. 19 is a flow chart showing processing of a switch module in a conventional cold standby.

FIG. 19 is a flow chart showing processing of the switch module 110 in the conventional cold standby. The switch module 110 is called from the failure monitoring module 107 in step 1803, and performs processing described below.

The switch module 110 refers to the notification of the failure occurrence which was received from the SVP 113, and acquires the server identifier 502 of the failure-occurred server 103 (1901).

The switch module 110 searches for the server 103 that matches with the acquired server identifier 502 from the server management table 117, and stops the matching server 103 (1902).

The switch module 110 determines whether the standby server 103 of a switching destination is set or not (1903).

If it is determined that the standby server 103 of the switching destination is not set, the switch module 110 notifies an administrator of the blade server that the switching destination is not set (1904).

If it is determined that the standby server 103 of the switching destination is set, the switch module 110 refers to the server management table 117 and acquires the identifier of the I/O device of the failure-occurred server 103 with reference to a server management table (1905). Specifically, the disk interface (HBA) stored in the server configuration 504 is acquired.

Next, the switch module 110 turns on the power of the standby server 103 (1906), and writes the identifier of the I/O device acquired in step 1905 into the standby server 103 (1907). Thereby, the standby server 103 can take over the operation which the failure-occurred server 103 was performing.

Hereinafter, processing of the embodiment of this invention will be described.

Figure 8:
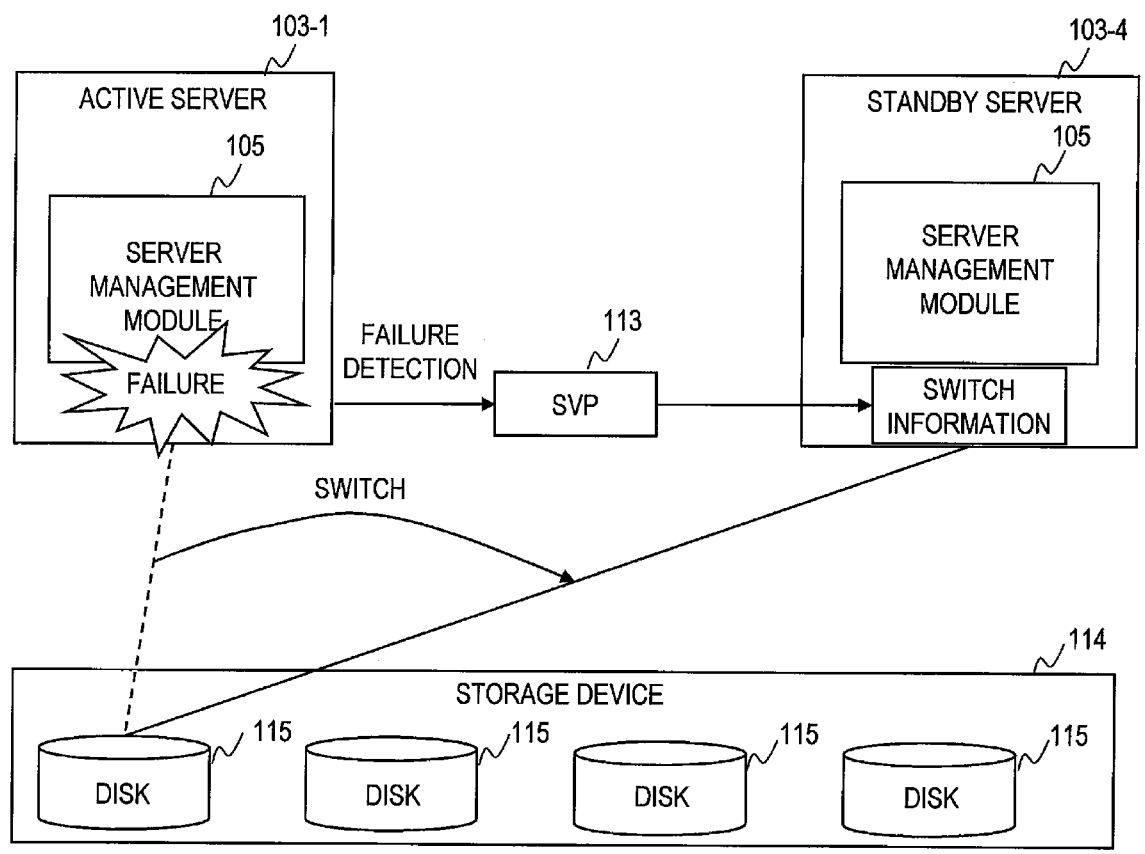
FIG. 8 is a diagram showing switching processing when a failure occurs in a server on which the server management module operates according to the embodiment of this invention.

FIG. 8 is a diagram showing switching processing when a failure occurs in the server 103 on which the server management module 105 operates according to the embodiment of this invention. It shows processing when a failure has occurred in the server 103-1 and the server 103-1 is switched to the server 103-4.

If a failure has occurred in the server 103-1, the BMC 204 of the server 103-1 notifies the SVP 113 that the failure occurred. The SVP 113 which received the notification refers to the server identifier 502 contained in the notification from the BMC 204 and searches for the matched information from the switch information storage area 406. If there was matched information, the SVP 113 writes information required in order to switch to the standby server 103 from the matched information into the server 103-4.

Thereby, the connection of the disk 115 in which the program for realizing the server management module 105 was stored is switched from the server 103-1 to the server 103-4, and the server management module 105 operates on the switched server 103-4. More specifically, the disk 115 is connected to the server 103-1 by the WWN 207 which was held by the disk interface 206 of the server 103-1 being written into the server 103-4. Moreover, by the MAC 205 which was held in the network interface of the server 103-1 being written into the server 103-4, the network recognizes the server as a server 103 on which a server management module operates (server 103-4).

Figure 9:
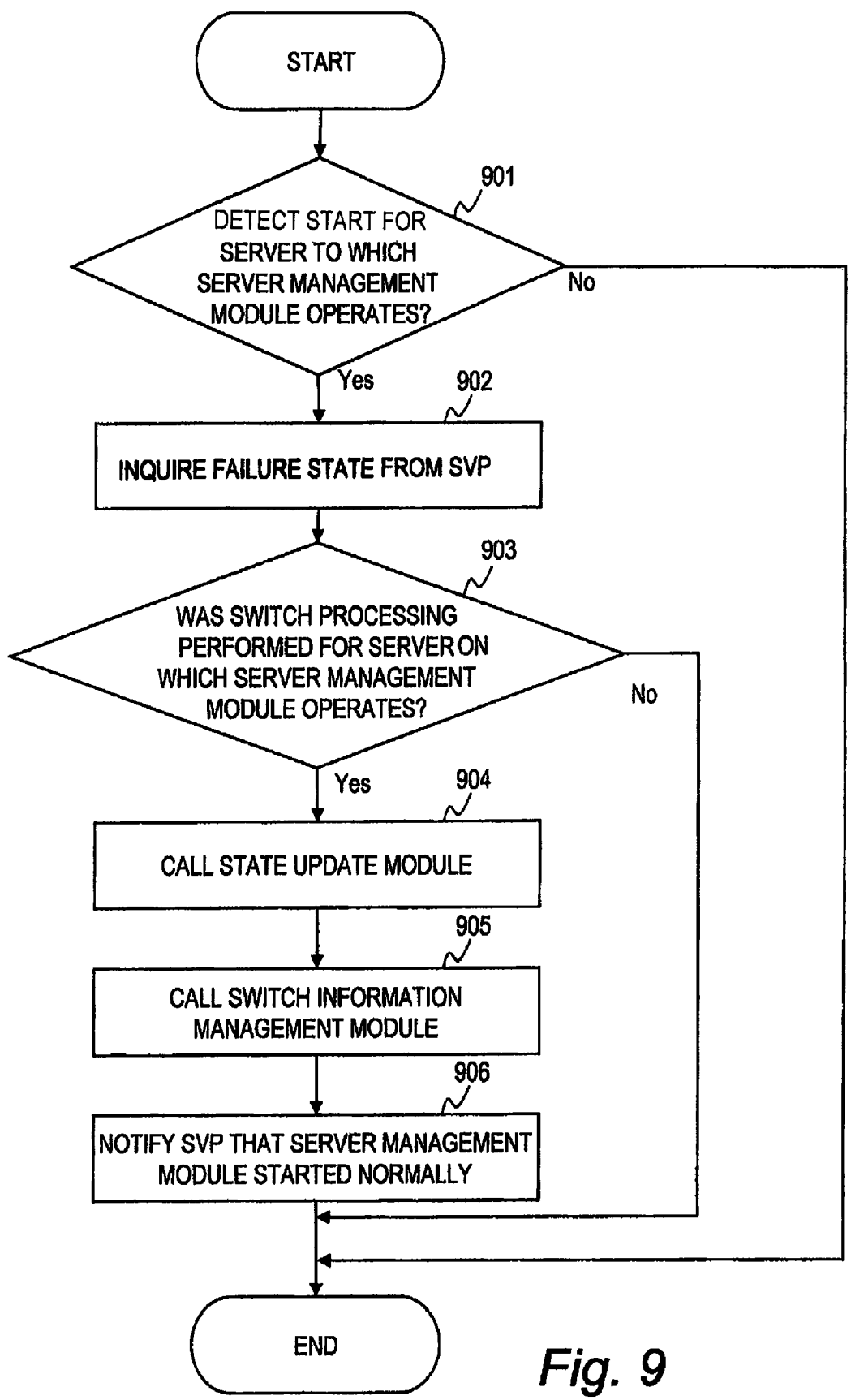
FIG. 9 is a flow chart showing processing of a start management module according to the embodiment of this invention.

FIG. 9 is a flow chart showing processing of the start management module 111 according to the embodiment of this invention.

After switching processing is performed and the server management table 117 is updated, the start management module 111 executes the following processing. It is noted that the method to update the server management table 117 will be described later with reference to FIG. 12.

First, the start management module 111 refers to the power state 503 and the type 508 in the server management table 117, and determines whether the server 103 on which the server management module 105 operates has started or not (901). In FIG. 5, although the type 508 of the server 103-4 is "SERVER MANAGEMENT", since the power state 503 is "OFF", the switching processing has not been completed. Therefore, the switching processing is completed, and after the server management table 117 is updated, processing of step 901 is performed. If it is determined that the server 103 on which the server management module 105 operates has not been started, the start management module 111 completes the process.

If it is determined that the server 103 on which the server management module 105 operates has been started, the start management module 111 inquires from the SVP 113 about the details of the failure (902), refers to the answer of the inquiry, and determines whether the switching processing of the server 103 on which the server management module 105 operates was performed or not (903).

If it is determined that the switching processing of the server 103-1 on which the server management module 105 operates has not been performed, the start management module 111 completes the process.

If it is determined that the switching processing of the server 103-1 on which the server management module 105 operates has been performed, the start management module 111 calls the state update module 112 (904). The called state update module 112 performs processing to be described later (refer to FIG. 12). Moreover, the start management module 111 calls the switch information management module 108 (905). The called switch information management module 108 performs processing to be described later (refer to FIG. 10).

When the processing to Step 905 is completed, the start management module 111 notifies the SVP 113 that the server management module 105 is operating normally on the server 103 which has taken it over (906).

Figure 10:
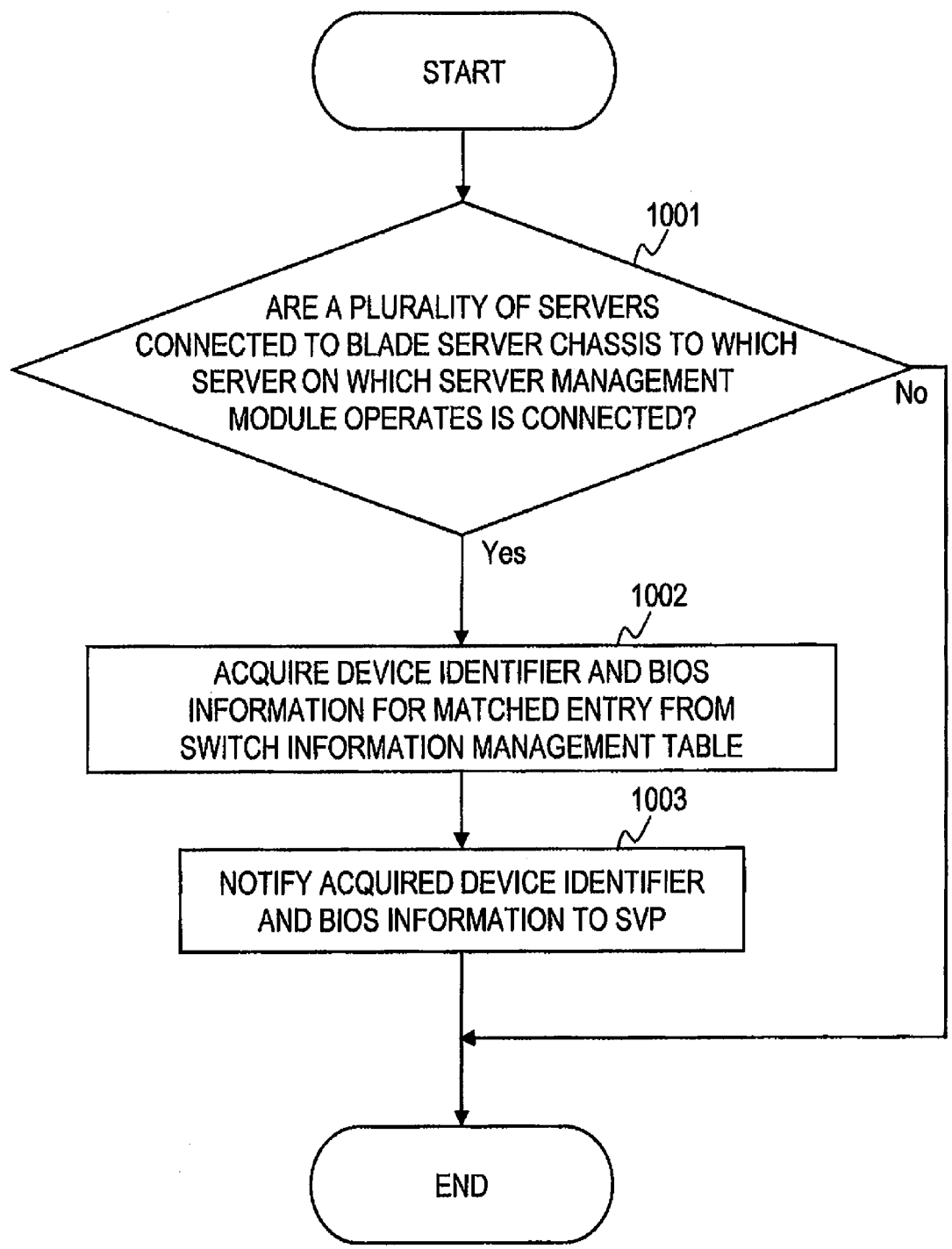
FIG. 10 is a flow chart showing processing of a switch information management module according to the embodiment of this invention.

FIG. 10 is a flow chart showing processing of the switch information management module 108 according to the embodiment of this invention. When a failure has occurred in the server 103 on which the server management module 105 operates, the following processing will be performed in order to acquire information for the SVP 113 to switch the server 103 to the standby server 103. Moreover, in step 905, the same processing will be performed also when the switch information management module 108 is called from the start management module 111.

The switch information management module 108 refers to the chassis identifier 501, the server identifier 502 and the type 508 stored in the server management table 117, and determines whether a plurality of servers 103 are connected to the blade server chassis 101 connected to the server 103 on which the server management module 105 operates (1001). In the determination of Step 1001, it is determined whether the server 103 on which the server management module 105 operates exists in the blade server or not.

The N+1 cold standby is premised on the environment of the blade configuration, and the aforementioned determination is made in order to identify in which blade server the server 103 on which the server management module 105 operates is installed. In FIG. 5, since servers 103-1, 103-2, 103-3 and 103-4 are connected to the blade server chassis 101 on which the server 103 on which the server management module 105 operates is connected, it is determined that a plurality of servers 103 are connected to the blade server chassis 101 to which the server 103 on which the server management module 105 operates is connected.

If it is determined that a plurality of servers 103 are not connected to the blade server chassis 101 to which the server 103 on which the server management module 105 operates is connected, the switch information management module 108 completes the process.

If it is determined that a plurality of servers 103 are connected to the blade server chassis 101 connected to the server 103 on which the server management module 105 operates, the switch information management module 108 searches the switch information management table 119 using the server identifier 502 which corresponds to the server 103 on which the server management module 105 operates as a search key, and acquires the device identifier 703 and the BIOS information 704 from the entry which matches the server identifier 502 (1002).

The switch information management module 108 notifies the SVP 113 of the server identifier 502 of the server 103 on which the server management module 105 operates, the server identifier 502 of the standby server 103, and the acquired device identifier 703 and the BIOS information 704, and completes the process (1003).

The SVP 113 stores in the switch information storage area 406 the server identifier 502 of the server 103 on which the server management module 105 operates, the server identifier 502 of the standby server 103, and the identifier 703 and the BIOS information 704 that were notified.

FIG. 11 is a diagram showing an example of the switch information storage area 406 according to the embodiment of this invention.

The information 1101 manages the server identifier of the server on which the server management module operates, the server identifier of the standby server 103, and the switching information.

The server identifier of the server on which the server management module operates is stored in a content field 1102 as the server identifier 502 of the server 103 on which the server management module 105 operates, which was notified from the switch information management module 108.

The server identifier of the standby server 103 is stored in the content field 1102 as the server identifier 502 of the standby server 103 which was notified from the switch information management module 108.

The switching information is stored in the content field 1102 as the device identifier 703 and the BIOS information 704 which were notified from the switch information management module 108.

Figure 12:
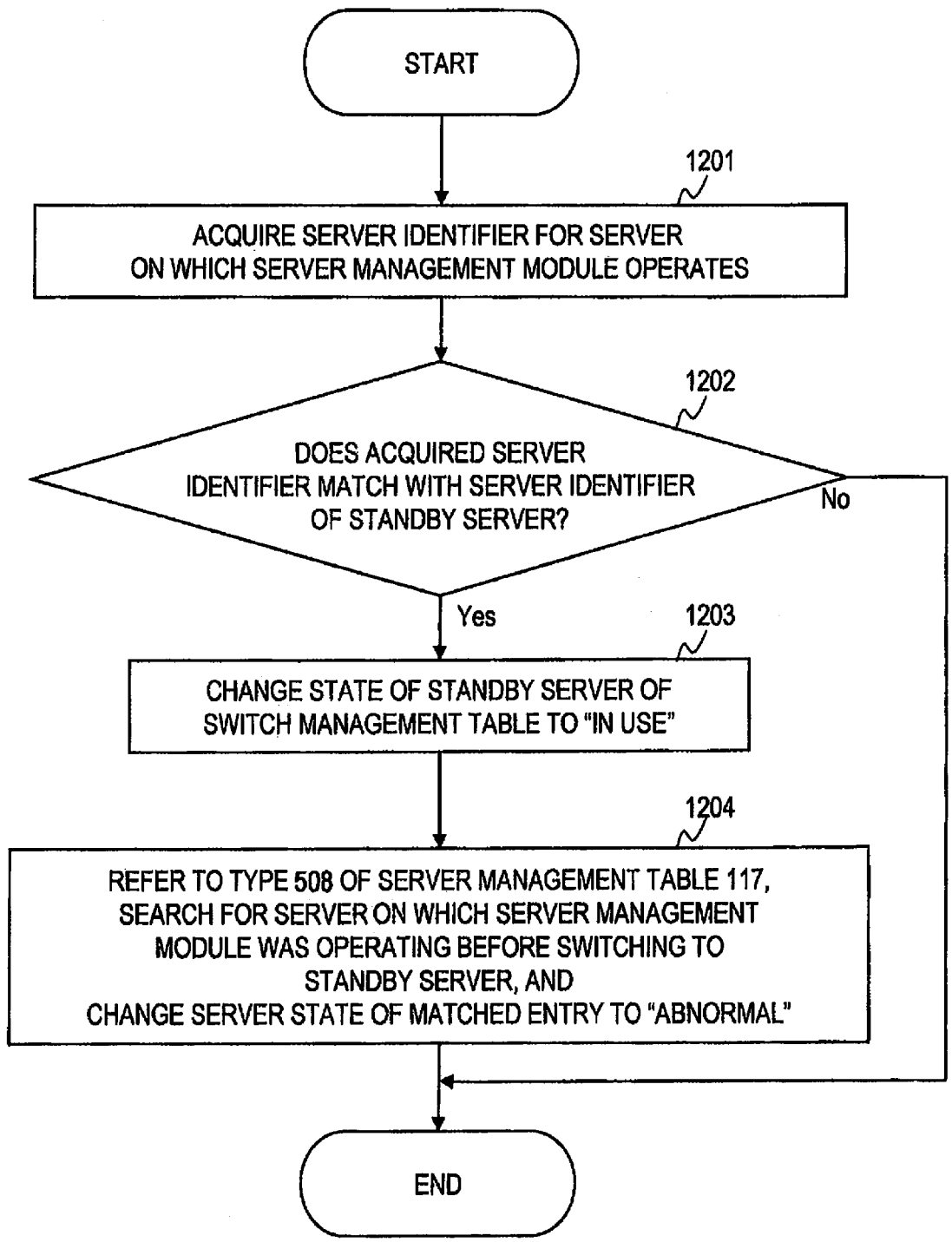
FIG. 12 is a flow chart showing processing of a state update module according to the embodiment of this invention.

FIG. 12 is a flow chart showing processing of the state update module 112 according to the embodiment of this invention. The state update module 112 performs the following processing, after being called by the start management module 111.

The state update module 112 acquires the server identifier 502 of the server 103 on which the server management module 105 is operating from the server management table 117 (1201), and determines whether the acquired server identifier 502 matches with the server identifier 502 of the standby server 103 or not (1202).

If it is determined that the acquired server identifier 502 does not match with the server identifier 502 of the standby server 103, the state update module 112 completes the process.

If it is determined that the acquired server identifier 502 matches with the server identifier 502 of the standby server 103, the state update module 112 changes the state 604 of the switch management table 118 to "IN USE" (1203).

Then, the state update module 112 refers to the type 508 of the server management table 117, searches for the server 103 on which the server management module 105 was operating before being switched to the standby server 103, and changes the server state 506 of the corresponding entry to "ABNORMAL". Moreover, the state update module 112 writes the server identifier 502 of the standby server 103 which was switched to into the switching destination 507 of the corresponding entry (1204).

Figure 13:
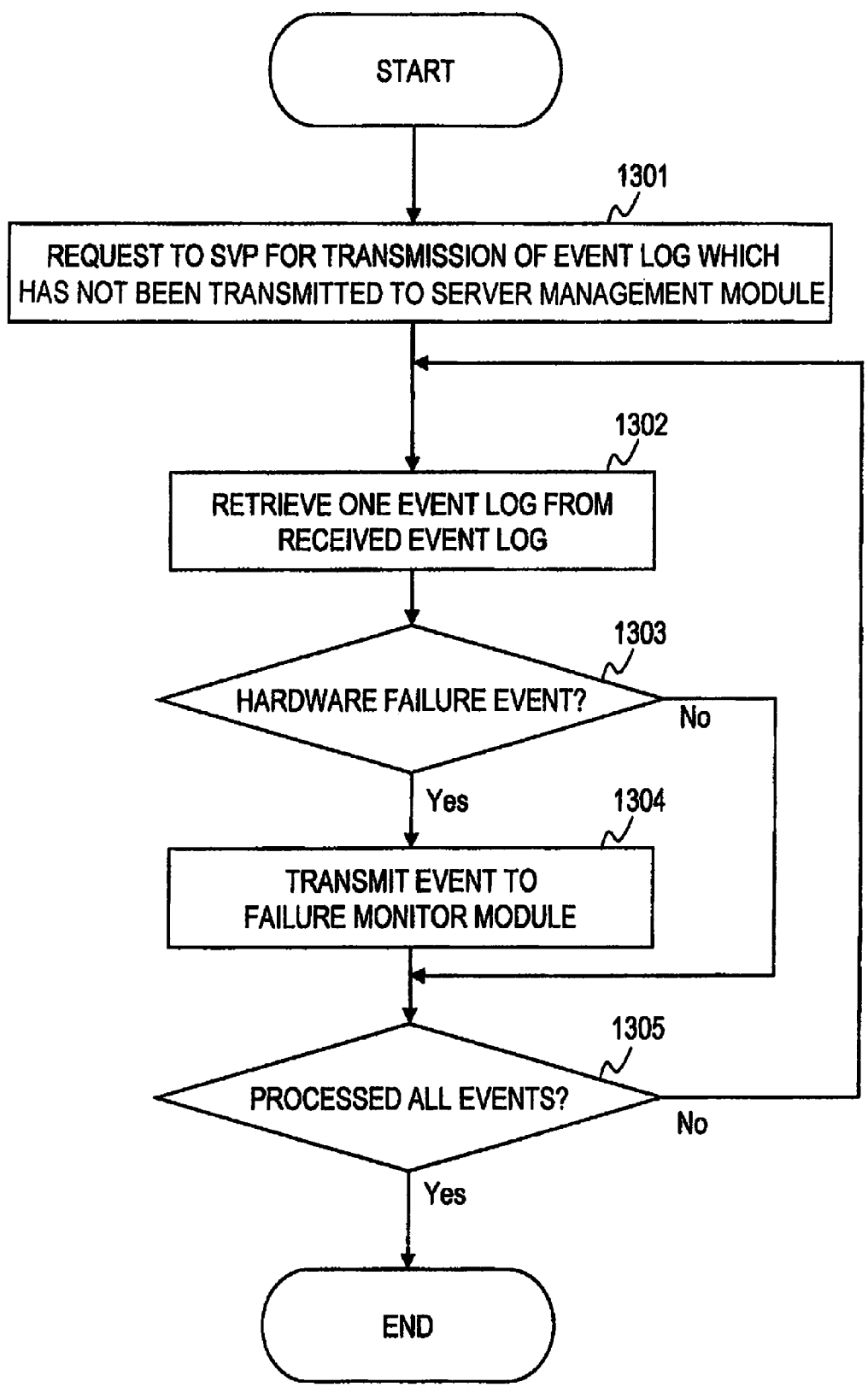
FIG. 13 is a flow chart showing processing of an event log management module according to the embodiment of this invention.

FIG. 13 is a flow chart showing processing of the event log management module 109 according to the embodiment of this invention. The event log management module 109 performs the following processing after the start management module 111 completes its processing.

After the processing of Step 906 is performed, the event log management module 109 requests from the SVP 113 transmission of the event log which has not been transmitted to the server management module 105 (1301). It is noted that processing of Step 1301 may be performed in step 906.

The event log management module 109 which received the event log from the SVP 113 takes one event log from the received event log (1302), and determines whether the event log relates to a hardware fault (1303).

If it is determined that the event log does not relate to a hardware fault, the event log management module 109 proceeds to step 1305.

If it is determined that the event log relates to a hardware fault, the event log management module 109 transmits the event to the failure monitoring module 107 (1304).

After the processing of Steps 1301 to 1304, the event log management module 109 determines whether it has completed processing all of the received events (1305).

If it is determined that not all the received events are processed, the event log management module 109 returns to step 1302, and performs the same processing.

If it is determined that all the received events are processed, the event log management module 109 completes the process.

The above is the processing of the server management module 105 of this embodiment. Hereinafter, processing of the SVP 113 will be described.

Figure 14:
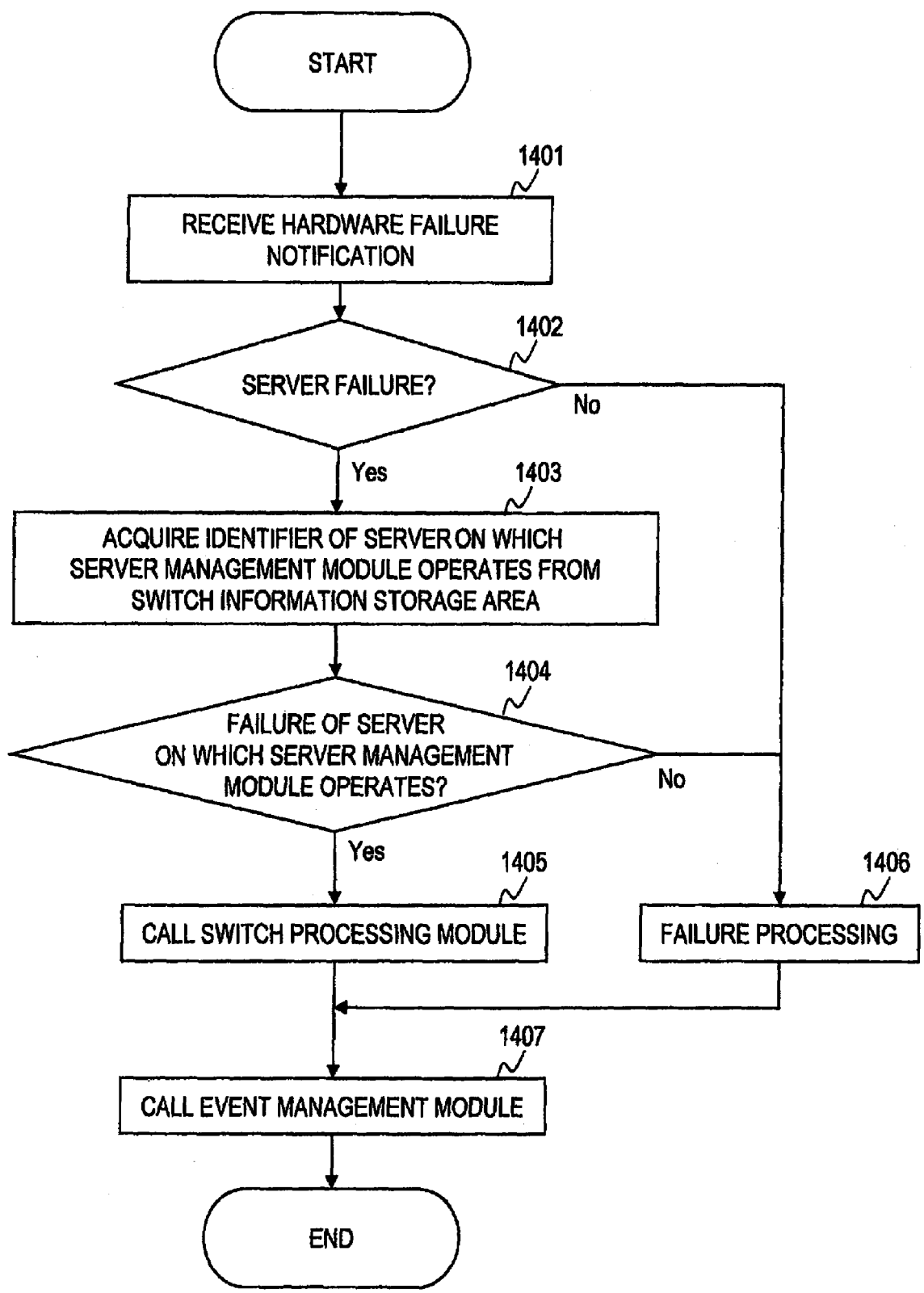
FIG. 14 is a flow chart showing processing of a failure detection module according to the embodiment of this invention.

FIG. 14 is a flow chart showing processing of the failure detection module 403 according to the embodiment of this invention. This processing starts by a notification of a hardware fault being transmitted from the server 103.

First, the failure detection module 403 receives the notification of a hardware fault from the BMC 204 of the server 103 (1401).

The failure detection module 403 determines whether the received hardware fault notification relates to an failure of the server 103 or not (1402).

If it is determined that the received hardware fault notification does not relate to an failure of the server 103, the failure detection module 403 performs failure processing corresponding to the received hardware fault notification (1406), and the process proceeds to step 1407. Examples of hardware faults other than those of the server 103 include failure of the power supply of the blade server and a fan failure.

If it is determined that the received hardware fault notification relates to the failure of the server 103, the failure detection module 403 acquires the server identifier 502 of the server on which the server management module 105 is operating from the switch information storage area 406 (1403).

The failure detection module 403 refers to the server identifier 502 of the failure-occurred server 103 and the acquired server identifier 502, and determines whether it is the failure of a server 103 on which the server management module 105 operates (1404).

If it is determined that it is not an failure of the server 103 on which the server management module 105 operates, the failure detection module 403 performs failure processing of the server 103 (1406), and the process proceeds to step 1407. Examples of the failure processing of the server 103 include switching processing using conventional cold standby.

If it is determined that it relates to the failure of the server 103 on which the server management module 105 operates, the failure detection module 403 calls the switching processing module 405 (1405). Details of the processing of the called switching processing module 405 will be described later with reference to FIG. 15.

The failure detection module 403 calls the event management module 404 in order to transmit the event of the failure to the server management module 105 (1407). Detailed processing of the called event management module 404 will be described later referring to FIG. 16.

Figure 15:
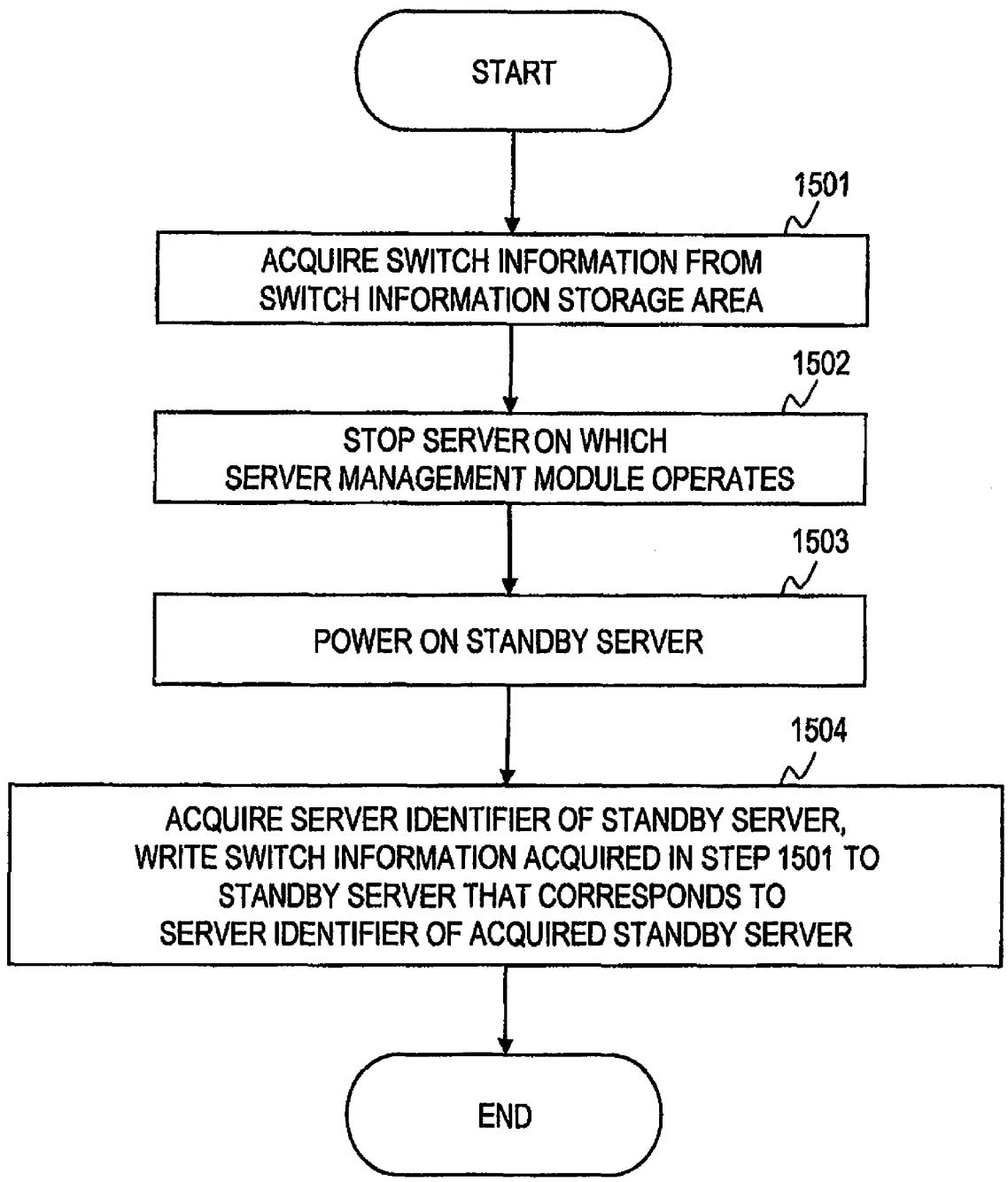
FIG. 15 is a flow chart showing processing of a switching processing module according to the embodiment of this invention.

FIG. 15 is a flow chart showing processing of the switching processing module 405 according to the embodiment of this invention.

In step 1405 in FIG. 14, the switching processing module 405 called from the failure detection module 403 acquires switching information from the switch information storage area 406 (1501).

Then, the switching processing module 405 stops the server 103 on which the failure-occurred server management module 105 operates (1502).

The switching processing module 405 turns on the power of the standby server 103, and starts the standby server (1503).

Then, the switching processing module 405 refers to the server identifier 502 of the standby server contained in the switching information acquired in step 1501, and writes the switching information acquired in step 1501 into the standby server 103 that matches with the server identifier 502 of the standby server 103 (1504). By this processing, the standby server 103, and the disk 115 of the storage device 114 in which the program which realizes the server management module 105 is stored are connected.

Figure 16:
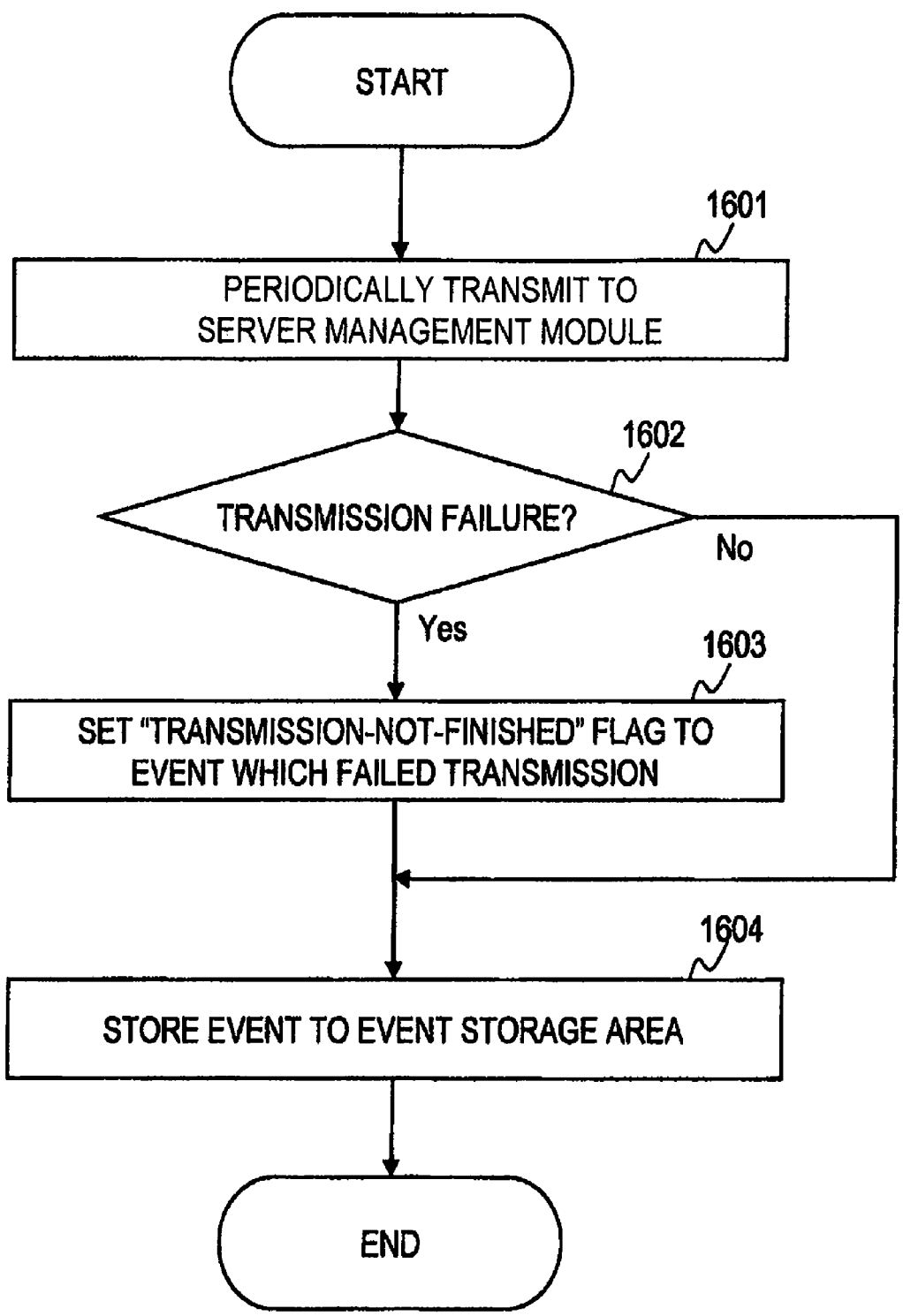
FIG. 16 is a flow chart showing processing of an event management module according to the embodiment of this invention.

FIG. 16 is a flow chart showing processing of the event management module 404 according to the embodiment of this invention. The event management module 404 transmits to the server management module 105 periodically events which it received from the server 103.

In step 1407 of FIG. 14, the event management module 404 called from the failure detection module 403 transmits an event log to the server 103 on which the server management module 105 operates (1601).

The event management module 404 determines whether the event log was correctly transmitted to the server 103 on which the server management module 105 operates. That is, the event management module 404 determines whether a transmission failure occurred or not (1602).

If it is determined that a transmission failure has not occurred, the event management module 404 proceeds to step 1604.

If it is determined that a transmission failure has occurred, the event management module 404 sets a not-transmitted flag to the server 103 on which the server management module 105 operates to the event which was not able to be transmitted (1603).

The event management module 404 stores in the event storage area 407 the event transmitted to the server 103 on which the server management module 105 operates, and the event to which the not-transmitted flag is set (1604).

By setting the not-transmitted flag to the event for which the transmission failure occurred, the event which the server management module 105 taken over by the standby server 103 was not able to receive during the switching processing can be transmitted to the server management module 105 taken over by the standby server 103. Thereby, the consistency of the server management module 105 between before and after the switching processing can be maintained. Moreover, the received event log can be processed correctly (refer to FIG. 13).

FIG. 17 is a diagram showing an example of the event storage area 407 according to the embodiment of this invention.

The event storage area 407 manages time 1701, event 1702, and transmission state 1703.

The time 1701 stores the time when the event occurred. The event 1702 stores the details of the occurred event. The transmission state 1703 stores information showing whether the event was transmitted to the server 103 on which the server management module 105 operates. Specifically, when an event is transmitted to the server 103 on which the server management module 105 operates, "FINISHED" is stored in the transmission state 1703, and when an event is not transmitted to the server 103 on which the server management module 105 operates, "NOT FINISHED" is stored in the transmission state 1703.

In accordance with this invention, by setting switching information in the SVP 113 in advance, when a failure occurs in the server 103 on which the server management module 105 operates, the SVP 113 which detected the failure can write the switching information in the standby server 103, and can make the standby server 103 take over the server management module 105 quickly. Moreover, the SVP 113 can notify the server management module 105 taken over by the standby server 103 that the switching processing was performed due to the failure of the server 103 on which the server management module 105 was operating.

Furthermore, the server management module 105 which is operating on the standby server 103 can know from the SVP 113 that the failure occurred in the server management module 105 itself.

Moreover, since the event log which the server management module 105 was not able to receive before and after the switching processing can be acquired from the SVP 113, the consistency of the server management module 105 can be maintained. Also, the server management module 105 which is operating at the standby server 103 can process the received event log correctly.

In this embodiment, although the SVP 113 transmitted the event log to the server management module 105 after receiving an acquisition request of the event log from the server management module 105, this invention is not limited to this. The SVP 113 may transmit an event log to the started standby server 103.

While the present invention has been described in detail and pictorially in the accompanying drawings, the present invention is not limited to such detail but covers various obvious modifications and equivalent arrangements, which fall within the purview of the appended claims.

What is claimed is:

1. A failover method performed in a computer system having:
   a first computer which performs an operation,
   a plurality of standby computers,
   a second computer which has a management module which manages the first computer and the plurality of standby computers, and
   a third computer which manages starting and stopping of the standby computers and manages all of the computers included in the computer system;
   the method including:
   a first step of acquiring, by the third computer, configuration information of the first computer, the second computer and the plurality of standby computers from the management module of the second computer;
   a second step of detecting, by the third computer, a failure occurring on the computer system;
   a third step of determining, by the third computer, whether the detected failure is a failure of the first computer or a failure of the second computer;
   a fourth step of notifying, by the third computer, the second computer that a failure has occurred in the first computer in a case where the detected failure is the failure of the first computer;
   a fifth step of taking over, by the second computer which has received the notification of the failure from the third computer, the operation from the first computer to one of the plurality of standby computers;
   a sixth step of setting up, by the third computer, the management module on the one of the plurality of standby computers based on the acquired configuration information in a case where the detected failure is the failure of the second computer; and
   a seventh step of inquiring, by the one of the plurality of standby computers set up with the management module, to the third computer whether a reason of failover is the failure of the second computer, in a case of starting the standby computer set up with the management module.

2. The failover method according to claim 1, further including a step of notifying, by the third computer, the management module of the failure of the second computer in a case where the third computer receives an inquiry from the standby computer set up with the management module.

3. The failover method according to claim 1, wherein:
   the sixth step includes:
   a step of writing, by the third computer, the acquired configuration information of the second computer into the standby computer set up with the management module.

4. The failover method according to claim 1, further comprising:
   a step of holding, by the third computer, an event transmitted to the second computer before the management module is switched from the second computer to the standby computer which is to be setup with the management module in a case of detecting the failure of the second computer.

5. The failover method according to claim 1, further comprising:
   a step of starting, by the third computer, the standby computer set up with the management module after stopping the second computer.

6. The failover method according to claim 1, further comprising:
   a step of updating, by the standby computer set up with the management module, the configuration information of the first computer, the second computer and the plurality of standby computers in a case of detecting the failure of the second computer.

7. The failover method according to claim 4, wherein:
   the seventh step includes:
   a step of acquiring, by the standby computer set up with the management module, an event transmitted to the second computer from the third computer; and
   a step of performing processing of the acquired event before the management module is switched from the second computer to the standby computer set up with the management module.

8. A computer system comprising:
   a first computer which performs an operation;
   a plurality of standby computers;
   a second computer which has a management module which manages the first computer and the plurality of standby computers; and
   a third computer which manages starting and stopping of the standby computers and manages all of the computers included in the computer system,
   wherein:
   the third computer acquires configuration information of the first computer, the second computer and the standby computers from the management module of the second computer,
   the third computer detects a failure occurring in the computer system,
   the third computer determines whether the detected failure is a failure of the first computer or a failure of the second computer,
   the third computer notifies the second computer that a failure has occurred in the first computer in a case where the detected failure is the failure of the first computer,
   the second computer which received the notification of the failure from the third computer takes over the operation from the first computer to one of the plurality of standby computers, the third computer sets up the management module on the one of the plurality of standby computers based on the acquired configuration information in a case where the detected failure is the failure of the second computer, and the one of the plurality of standby computers set up with the management module inquires to the third computer whether a reason of failover is the failure of the second computer, in a case of starting the one of the plurality of standby computers.

9. The computer system according to claim 8, wherein the third computer notifies the management module of the failure of the second computer in a case where the third computer receives an inquiry from the one of the plurality of standby computers set up with the management module.

10. The computer system according to claim 8, wherein the third computer writes the acquired configuration information of the second computer into the one of the plurality of standby computers set up with the management module.

11. The computer system according to claim 8, wherein the third computer holds an event transmitted to the second computer before the management module is switched from the second computer to the one of the plurality of standby computers which is to be setup with the management module in a case of detecting the failure of the second computer.

12. The computer system according to claim 8, wherein the third computer starts the one of the plurality of standby computers set up with the management module after stopping the second computer.

13. The computer system according to claim 8, further comprising: the one of the plurality of standby computers set up with the management module updates the configuration information of the first computer, the second computer and the plurality of standby computers in a case of detecting the failure of the second computer.

14. The computer system according to claim 11, wherein the one of the plurality of standby computers set up with the management module acquires an event transmitted to the second computer from the third computer; and performs processing of the acquired event before the management module is switched from the second computer to the one of the plurality of standby computers.

* * * * *